(12) United States Patent
Kim

(10) Patent No.: US 8,484,437 B2
(45) Date of Patent: Jul. 9, 2013

(54) DATA PROCESSING APPARATUS USING PRE-FETCHED DATA

(75) Inventor: Seok-In Kim, Gyeonggi-do (KR)

(73) Assignee: Hynix Semiconductor, Gyeonggi-do (KR)

( * ) Notice: Subject to any disclaimer, the term of this patent is extended or adjusted under 35 U.S.C. 154(b) by 268 days.

(21) Appl. No.: 12/876,524

(22) Filed: Sep. 7, 2010

(65) Prior Publication Data

US 2012/0011343 A1   Jan. 12, 2012

(30) Foreign Application Priority Data

Jul. 8, 2010   (KR) .................. 10-2010-0065923

(51) Int. Cl.
*G06F 13/00* (2006.01)
*G06F 13/28* (2006.01)
*G06F 9/26* (2006.01)
*G06F 9/34* (2006.01)
*G06F 9/30* (2006.01)
*G11C 8/00* (2006.01)

(52) U.S. Cl.
USPC ....... 711/213; 711/154; 712/207; 365/230.02

(58) Field of Classification Search
USPC ............... 711/213, 154; 365/230.02; 712/207
See application file for complete search history.

(56) References Cited

U.S. PATENT DOCUMENTS

| 5,032,985 | A | * | 7/1991 | Curran et al. ................. 711/124 |
| 5,276,853 | A | * | 1/1994 | Yamaguchi et al. .......... 711/131 |
| 5,649,144 | A | * | 7/1997 | Gostin et al. ................. 711/220 |
| 7,401,179 | B2 | * | 7/2008 | Loffler .......................... 711/104 |
| 2004/0225838 | A1 | * | 11/2004 | Biles ............................ 711/118 |

FOREIGN PATENT DOCUMENTS

| JP | 2003345649 | 12/2003 |
| KR | 1019930005766 | 6/1993 |
| KR | 1020040093984 | 11/2004 |
| KR | 1020050089117 | 9/2005 |

OTHER PUBLICATIONS

Notice of Allowance issued by the Korean Intellectual Property Office on Oct. 24, 2012.

* cited by examiner

*Primary Examiner* — Christian P Chace
*Assistant Examiner* — Rocio Del Mar Perez-Velez
(74) *Attorney, Agent, or Firm* — IP & T Group LLP

(57) ABSTRACT

A data processing apparatus includes a pre-fetch unit configured to divide and store data, a validation setting unit configured to store information regarding whether or not the data stored in the pre-fetch unit are valid, an address generation unit configured to generate an address for reading/storing the data from/in the pre-fetch unit, and a pre-fetch control unit configured to control a storage position of the data in the pre-fetch unit by using the address and information of the address generation unit and the validation setting unit.

7 Claims, 2 Drawing Sheets

US 8,484,437 B2

1

DATA PROCESSING APPARATUS USING PRE-FETCHED DATA

CROSS-REFERENCE TO RELATED APPLICATION

The present application claims priority of Korean Patent Application No. 10-2010-0065923, filed on Jul. 8, 2010, which is incorporated herein by reference in its entirety.

BACKGROUND OF THE INVENTION

Exemplary embodiments of the present invention relate to a data pre-fetch apparatus and method, and more particularly, to an apparatus and method for pre-fetching and processing data according to processing capacity of a data processor.

In general, an operating speed of an electronic device such as a computer depends on a processing speed of a central processing unit (CPU). Since a processing speed of peripheral devices inside an electronic device is relatively slow compared with a processing speed of a CPU, a cache memory may be used to increase an operating speed of an electronic device.

If data is read from a hard disk each time a program is executed by a CPU, an overall processing speed of an electronic device is lowered because a processing speed of the hard disk is relatively slow compared with the CPU. Hence, a temporary memory is provided between a random access memory (RAM) and a CPU. Contents/data inputted to the RAM when a program is initially executed are stored in the temporary memory, and the CPU reads data or corresponding codes from the temporary memory. In this manner, a data read time may be shortened.

Meanwhile, electronic devices such as a computer may use an 8-bit core, that is, an 8-bit CPU. In this case, if a cache memory is applied to the 8-bit core in order to increase a data processing speed, a manufacturing cost of a product may be increased due to factors such as a chip size and a chip cost, thereby weakening the competitiveness of the product in the market. That is, although the processing speed of the product increases, the marketability of the product may be degraded since the price thereof is increased.

SUMMARY OF THE INVENTION

Exemplary embodiments of the present invention are directed to a data processing apparatus and method which are capable of increasing a processing speed of a core.

In accordance with an exemplary embodiment of the present invention, a data processing apparatus includes a pre-fetch unit configured to divide and store data, a validation setting unit configured to store information regarding whether or not the data stored in the pre-fetch unit are valid an address generation unit configured to generate an address for reading/storing the data from/in the pre-fetch unit, and a pre-fetch control unit configured to control a storage position of the data in the pre-fetch unit by using the address and information of the address generation unit and the validation setting unit.

In accordance with another exemplary embodiment of the present invention, a data processing method for pre-fetching 2×N-bit data and processing the data on the basis of N bits includes dividing the 2×N-bit data and storing the two N-bit data, storing information regarding whether or not the stored data are valid, outputting an address for reading the stored data, and sequentially reading the stored data, and changing information regarding whether or not the stored data are valid.

2

DESCRIPTION OF SPECIFIC EMBODIMENTS

Figure 1:
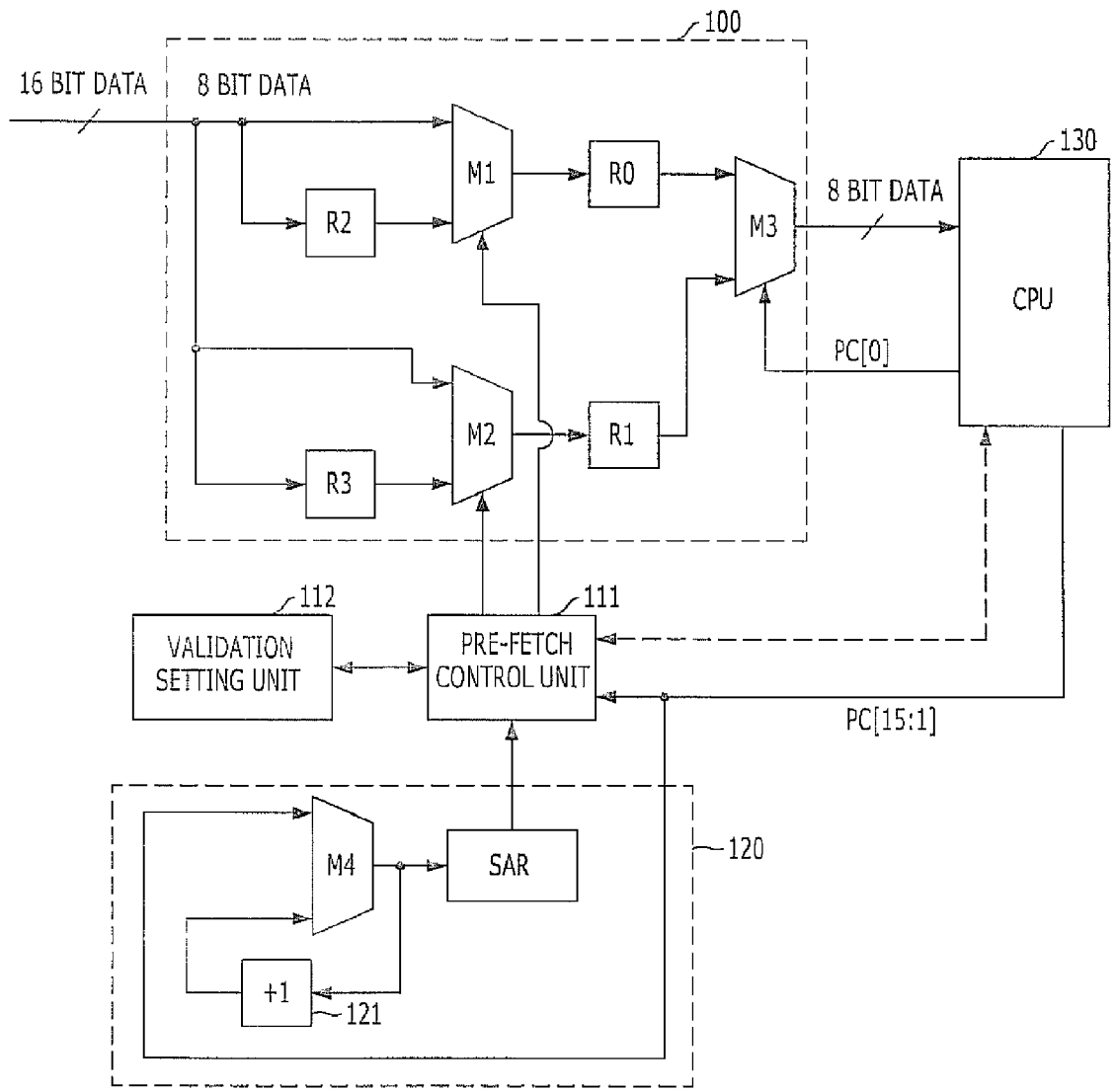
FIG. 1 is an internal configuration diagram of a data read apparatus in accordance with an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is an internal configuration diagram of a data read apparatus in accordance with an exemplary embodiment of the present invention.

The schematic configuration of the data read apparatus in accordance with this exemplary embodiment of the present invention is described below with reference to FIG. 1. Data such as an instruction is inputted to and divided by a pre-fetch unit 100. For example, the pre-fetch unit 100 may store 16-bit input data as two 8-bit data. The 16-bit or 8-bit data may be encoded codes, control data, or general data. For convenience of explanation, the encoded codes, the control data, or the general data are collectively referred to as data.

The 8-bit data stored in the pre-fetch unit 100 are respectively outputted according to a command of a CPU 130. The CPU 130 outputs a 15-bit program counter PC[15:1] to a pre-fetch control unit 111 and a pre-fetch address generation unit 120. The 15-bit program counter PC[15:1] indicates a start address of read data. The pre-fetch control unit 111 performs a control to store the 16-bit input data in registers of the pre-fetch unit 100, and stores validation information of the stored data in a validation setting unit 112. Also, the pre-fetch control unit 111 controls the pre-fetch unit 100 to sequentially output the stored data according to the address generated by the pre-fetch address generation unit 120.

The configuration of the pre-fetch unit 100 is described in more detail.

The pre-fetch unit 100 receives 16-bit data and divides the received 16-bit data into two 8-bit data. The two 8-bit data are inputted to and stored in a third register R2 and a fourth register R3, respectively. Also, the data inputted to the third register R2 are simultaneously inputted to a first multiplexer M1, and the data inputted to the fourth register R3 are simultaneously inputted to a second multiplexer M2. The first multiplexer M1 and the second multiplexer M2 output the inputted data under the control of the pre-fetch control unit 111. The outputs of the first multiplexer M1 and the second multiplexer M2 is described in more detail with reference to a control flowchart which is to be described later.

The 8-bit data outputted from the first multiplexer M1 are inputted to and stored in a first register R0, and the 8-bit data outputted from the second multiplexer M2 are inputted to and stored in a second register R1. The data stored in the first register R0 and the second register R1 are inputted to a third multiplexer M3. The third multiplexer M3 selectively inputs the inputted data to the CPU 130 in response to a program counter PC[0].

Next, the configuration of the pre-fetch address generation unit 120 is described.

The pre-fetch address generation unit 120 receives the 15-bit program counter PC[15:1]. The 15-bit program counter PC[15:1] is inputted to a fourth multiplexer M4. Also, the fourth multiplexer M4 receives an address as another input. An address adder 121 generates the address by increasing the output of the fourth multiplexer M4 by 1, and inputs the generated address to the fourth multiplexer M4. The fourth multiplexer M4 selects its output under the control of the pre-fetch control unit 111. The selection of the output of the fourth multiplexer M4 is described in more detail in the explanation of the operation of the pre-fetch control unit 111 and the control flowchart which is to be described later. Also, the output of the fourth multiplexer M4 is inputted to and stored in a start address register (SAR). The start address register outputs a start address to the pre-fetch control unit 111.

When the CPU 130 reads the 16-bit data from a memory device (not shown), such as a RAM or a hard disk (, the pre-fetch control unit 111 receives the 15-bit program counter value. The pre-fetch control unit 111 determines which register the data is to be stored in or outputted from, according to the stored value of the start address register, which is generated based on the program counter PC, and the validation information of the registers R0, R1, R2 and R3, which are stored in the validation setting unit 112.

The validation setting unit 112 indicates the validation of the values stored in the registers R0, R1, R2 and R3. The validation setting unit 112 is configured to indicate the validation under the control of the pre-fetch control unit 111. For example, when the data stored in the first register R0 and the second register R1 are valid, the validation information is set to a certain value, for example, "0" or "1". The certain value may be predefined in order to indicate that the values of the first register R0 and the second register R1 are valid. Also, when the values corresponding to the third register R2 and the fourth register R3 are valid, the value indicating the validation is set with respect to the third register R2 and the fourth register R3.

Figure 2:
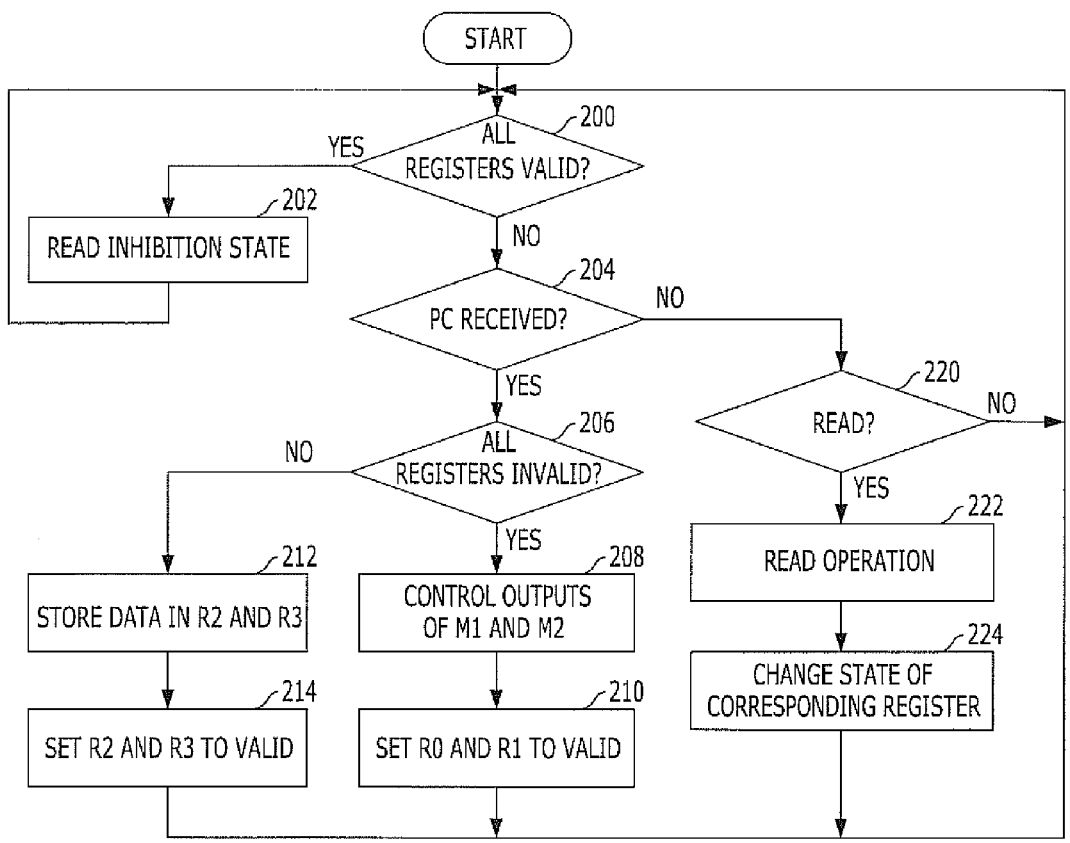
FIG. 2 is a flowchart illustrating the operation control of the data read apparatus in accordance with an exemplary embodiment of the present invention.

FIG. 2 is a flowchart illustrating the operation control of the data read apparatus in accordance with an exemplary embodiment of the present invention.

At step 200, the pre-fetch control unit 111 verifies whether or not data of all registers of the pre-fetch unit 100 are valid through the validation setting unit 112. When it is determined at the step 200 that all register state values set to the validation setting unit 112 are valid with respect to all registers of the pre-fetch unit 100, the process proceeds to step 202 to output a read inhibition state value to the CPU 130. At the step 202, the pre-fetch control unit 111 may output the read inhibition state value if necessary, or the CPU 130 can identify the state in advance.

Meanwhile, when it is determined at the step 200 that any data of the registers are invalid, the process proceeds to step 204 to determine whether or not a program counter PC is received from the CPU 130. That the program counter PC is received means that data is read from the RAM or the hard disk. Therefore, whether data is to be stored in the pre-fetch unit 100 can be confirmed by determining/detecting whether the program counter PC is received at the step 204.

When it is determined at the step 204 that the program counter PC is received, the process proceeds to step 206 to determine whether all the register state values stored in the validation setting unit 112 are invalid. When all the register state values are invalid, the pre-fetch control unit 111 proceeds to step 208 to perform a control operation so that the first multiplexer M1 and the second multiplexer M2 output inputted data, i.e. 8 BIT DATA, to be stored in the first register R0 and the second register R1. The pre-fetch control unit 111 proceeds to step 210 so that the register state values of the first register R0 and the second register R1 of the validation setting unit 112 are set to valid.

On the other hand, when it is determined at the step 206 that all the register state values are not invalid, the pre-fetch control unit 111 proceeds to step 212 so that the inputted data are stored in the third register R2 and the fourth register R3. The pre-fetch control unit 111 proceeds to step 214 so that the register state values of the third register R2 and the fourth register R3 of the validation setting unit 112 are set to valid. Also, when the data stored in the first register R0 and the second register R1 are sequentially read by the CPU 130, the pre-fetch control unit 111 performs a control operation so that the data stored in the third register R2 and the fourth register R3 are stored in the first register R0 and the second register R1.

When it is determined at the step 204 that the program counter PC is not received from the CPU 130, the pre-fetch control unit 111 proceeds to step 220 to determine whether or not the CPU 130 reads the data. The data read is achieved by selecting the output of the third multiplexer M3 by using the program counter PC[0]. In the case where the CPU 130 reads the data, the pre-fetch control unit 111 proceeds to step 222 to perform a read operation. The read operation of the pre-fetch control unit 111 is performed as described above. That is, when the data are stored in the third register R2 and the fourth register R3 and data is not stored in at least one of the first register R0 and the second register R1, the pre-fetch control unit 111 controls the first multiplexer M1 or the second multiplexer M2 to output the data stored in the third register R2 or the fourth register R3.

Accordingly as data are transferred as above, the state of the registers is changed. Therefore, the pre-fetch control unit 111 changes the register state values of the corresponding registers and stores the changed state values in the validation setting unit 112 at step 224.

In accordance with an exemplary embodiment of the present invention, the processing speed of the pre-fetch device is increased to thereby process the data at a high speed.

While the present invention has been described with respect to the specific embodiments, it will be apparent to those skilled in the art that various changes and modifications may be made without departing from the spirit and scope of the invention as defined in the following claims.

What is claimed is:

1. A data processing apparatus comprising:
a pre-fetch unit configured to divide and store data;
a validation setting unit configured to store information regarding whether or not the data stored in the pre-fetch unit are valid;
an address generation unit configured to generate an address for reading/storing the data from/in the pre-fetch unit; and
a pre-fetch control unit configured to control a storage position of the data in the pre-fetch unit by using the address and information of the address generation unit and the validation setting unit,
wherein the pre-fetch unit comprises:
a first register and a second register each configured to store a respective N-bit output of the data, where the data is 2×N bit data and N is any positive integer;

a first multiplexer configured to selectively output an output of the first register or an N-bit output of the data currently inputted;

a second multiplexer configured to selectively output an output of the second register or another N-bit output of the data currently inputted;

a third register and a fourth register configured to store an output of the first multiplexer and an output of the second multiplexer, respectively; and a third multiplexer configured to selectively output an output of the third register or an output of the fourth register, wherein, when all of the first to fourth registers are invalid, the first multiplexer outputs the N-bit output of the data currently inputted, and the second multiplexer outputs another N-bit output of the data currently inputted.

2. The data processing apparatus of claim 1, wherein, when the first and second registers are valid and the third and fourth registers are invalid, the first multiplexer outputs the output of the first register and the second multiplexer outputs the output of the second register, and when the first and second registers are invalid and the third and fourth registers are valid, the respective N-bit output of the data currently inputted is stored in the first and second registers.

3. The data processing apparatus of claim 1, wherein the validation setting unit is configured to store validation information of the data stored in the first to fourth registers.

4. The data processing apparatus of claim 1, wherein the pre-fetch control unit is configured to control the output of the first multiplexer and the output of the second multiplexer by using the address and information of the address generation unit and the validation setting unit.

5. The data processing apparatus of claim 1, further comprising a central processing unit (CPU) processing N bits of the data at once, and configured to read and process the data stored in the pre-fetch unit, where the data is 2×N bit data and N is any positive integer.

6. The data processing apparatus of claim 5, wherein the address generation unit comprises:

a multiplexer configured to output a program counter provided from the CPU or an increased program counter;

an address adder configured to increase an output of the multiplexer by 1, and provide the increased output to an input terminal of the multiplexer; and a start address register configured to store the output of the multiplexer and provide the output of the multiplexer to the pre-fetch control unit.

7. The data processing apparatus of claim 5, wherein, when all validation information set in the validation setting unit are valid, the pre-fetch control unit is configured to output a read inhibition signal to the CPU to prevent the CPU from reading data from other memory.

* * * * *